United States Patent [19]
Strieber

[11] Patent Number: 5,901,924
[45] Date of Patent: May 11, 1999

[54] SPEED ENHANCED POWERED PARACHUTE

[76] Inventor: Louis Charles Strieber, 6800 West Gate Blvd., #139B316, Austin, Tex. 78745

[21] Appl. No.: 09/030,323

[22] Filed: Feb. 25, 1998

Related U.S. Application Data

[XX .
[60] Provisional application No. 60/038,316, Feb. 26, 1997.
[51] Int. Cl.$^6$ .................................................... B64C 39/00
[52] U.S. Cl. ................................. 244/13; 244/46; 244/92; 244/903; 244/218; 244/48; 244/152
[58] Field of Search .................................. 244/13, 16, 46, 244/48, 51, 75 R, 900–904, 152, 218, 219, 145

[56] References Cited

U.S. PATENT DOCUMENTS

| | | | |
|---|---|---|---|
| 1,742,082 | 12/1929 | Keller | 244/48 |
| 3,140,842 | 7/1964 | Craigo et al. | 244/13 |
| 3,306,559 | 2/1967 | Girard | 244/48 |
| 4,050,654 | 9/1977 | Heckman | 244/16 |
| 4,133,500 | 1/1979 | Chapman | 244/901 |
| 4,934,630 | 6/1990 | Snyder | 244/13 |

Primary Examiner—Galen L. Barefoot

[57] ABSTRACT

A powered parachute or pendulum flying machine which includes a mechanism for shortening the chord length of the parachute wing, a mechanism for shortening the distance between the upper and lower airflow surfaces of the parachute wing, and a mechanism for adjusting position of the pilot module relative to the wing so as to adjust the center of gravity of the powered parachute. The mechanism for shortening chord length includes a tube running along the trailing edge of the parachute wing and control lines running from the tube to the pilot module. Pulling in the lines draws the tube forwardly and shortens the chord length. Preferably at the same time as the chord length is decreased, wing height is decreased by the mechanism for shortening the distance between the upper and lower airflow surfaces. Such is accomplished by collapsing a wall disposed between the upper and lower airflow surfaces to the pilot module. When chord length and wing height are decreased, drag is reduced and the speed of the powered parachute increases. To slow down the flying pendulum machine, the chord length lines and wing height lines are slowly released and the release or letting out of such lines is aided by air pressure in air cells in the parachute wing. Further, preferably at the same time as shortening chord length and frame and decreasing wing height, the pilot module is advanced forwardly on the wing via the center of gravity adjustment mechanism, which includes a toothed drive wheel meshing with a toothed frame portion of the wing. The toothed drive wheel is operated by the pilot pulling on a line, which drives a pulley on the drive wheel. Additionally, large scale modified versions of this speed enhanced power parachute can be used on aircraft as a short field take off and landing augmentation which is stowable during regular flight.

14 Claims, 5 Drawing Sheets

SPEED ENHANCED POWERED PARACHUTE

This application claims the benefit under 35 U.S.C. § 119(e) of my U.S. Provisional Pat. App. Ser. No. 60/038,316 filed Feb. 26, 1997, which is hereby incorporated by reference in its entirety into this application.

FIELD OF THE INVENTION

This application relates generally to parachutes, particularly to powered parachutes or pendulum style flying machines, and specifically to powered parachutes having speed enhancing features.

BACKGROUND OF INVENTION

A powered parachute is a pendulum style flying machine. A powered parachute conventionally has a parachute and a module suspended from and supported by the parachute. The module has an engine and propeller and in some cases a seat for a pilot and wheels on the module. A powered parachute is an ultralight flying machine. A powered parachute works well in mild weather and at low speeds where the primary purpose is pleasure flying. A conventional powered parachute may have a top speed of 25 to 30 miles per hour.

SUMMARY OF THE INVENTION

A general object of the present invention is to provide a unique powered parachute.

Another object of the present invention is to uniquely provide a center of gravity adjusting mechanism. The center of gravity adjusting mechanism changes the position of the module relative to the wing. The mechanism permits the pilot to place the module relatively rearwardly of the wing center of gravity and/or lift for slower speeds such as for take offs and landings. When relatively rearwardly of the wing center of gravity and/or lift or more precisely when the pilot module is relatively rearwardly of the center of lift of the wing, greater lift is provided. The mechanism permits the pilot to place the module relatively forwardly of the wing, or relatively forwardly of the center of lift of the wing, for higher speeds such as when flying at cruise altitude. Such provision produce less drag and less lift at a given speed, but a higher speed provides sufficient lift to stay airborne.

Another object of the present invention is to provide a powered parachute that uniquely includes a mechanism that adjusts the length of the chord of the wing. The mechanism draws the trailing edge of the wing toward the leading edge via lines extending from the powered parachute to the pilot module. The powered parachute may be flown faster with a wing having a shorter chord length.

Another object of the present invention is to provide a powered parachute that uniquely includes a mechanism for adjusting wing height. The mechanism includes lines engaged to walls between the upper and lower sheets of the airfoil shaped wing and running to the pilot module. By tugging on the lines, the pilot partially collapses the walls to draw the upper and lower sheets of the airfoil shaped wing towards each other to reduce the height of the wing. For a given amount of power, the powered parachute may be flown faster with a wing that provides less lift and is more narrow.

An advantage of the present powered parachute is speed. Features providing such an advantage include the center of gravity adjustment mechanism, the chord length adjusting mechanism, and the wing height adjusting mechanism.

Further, it should be noted that the frustoconical cage portion 24 is relatively elongate to space the pilot and any pilot seat at a relatively great distance from the propeller 18, thereby permitting a flow of air into the propeller that is less turbulent therefore providing greater efficiency for the propeller per given amount of horsepower than is conventionally provided.

Another advantage of the present powered parachute is that its speed is controllable. The powered parachute may fly at relatively slow speeds for take offs and landings.

Another advantage of the present powered parachute is that its mechanisms are simple and inexpensive to build, operate and maintain.

Another advantage of the present powered parachute is that it is safe. For example, since the mechanisms are mechanically operated, the mechanisms are reliable. Further, since a plurality of mechanisms and control lines are provided, failure of one or even several mechanisms or failure of one or even several lines does not fatally cripple the craft. Still further, each cable support line is of sufficient strength to hold the pilot module to the wing.

These and further objects, features and advantages of the present invention will become clearer in light of the following detailed description of the illustrative embodiments of this invention described in connection with the drawings.

All figures are drawn for ease of explanation of the basic teachings of the present invention only; the extensions of the figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

DESCRIPTION

Figure 1:
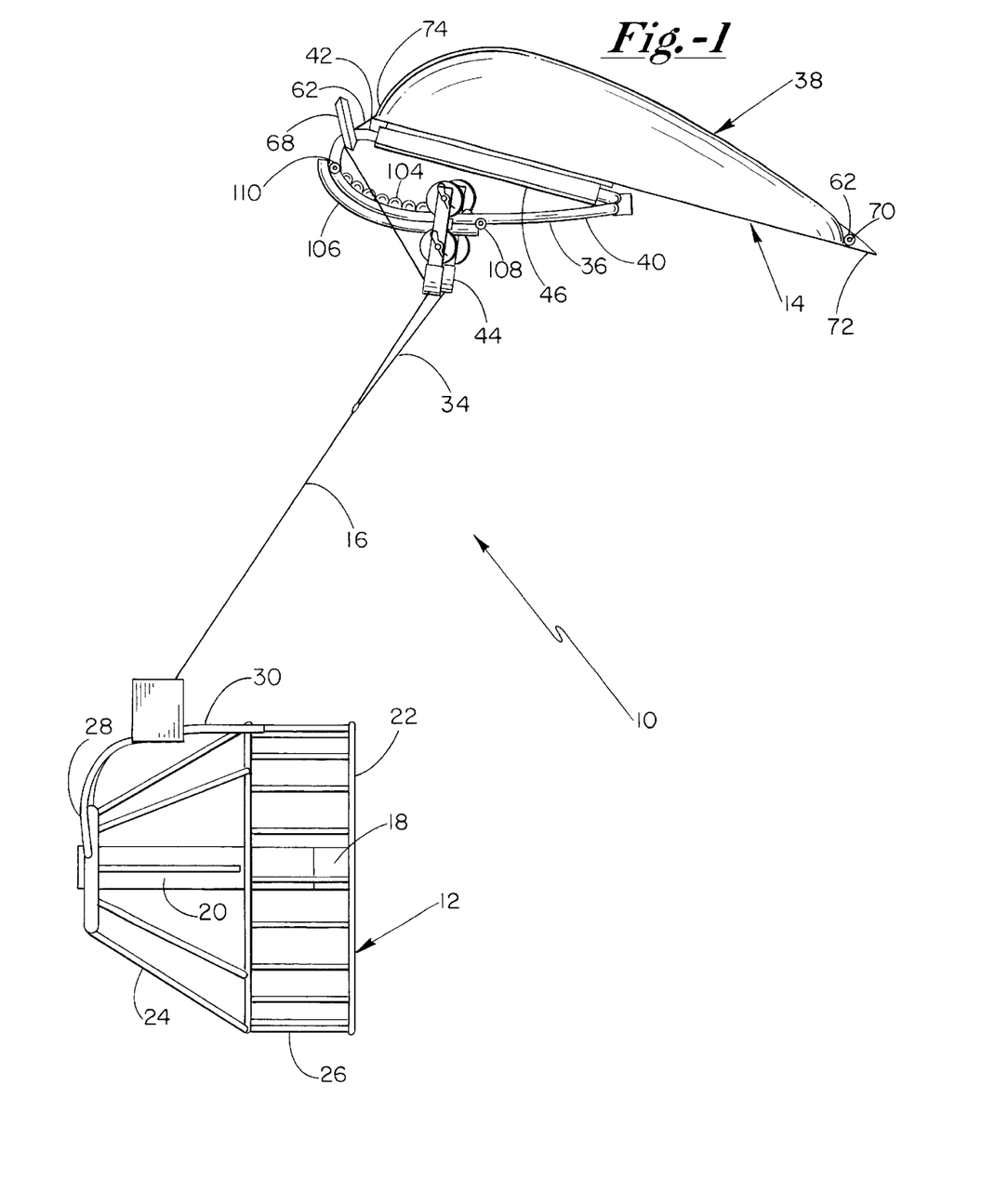
FIG. 1 is a side view of the powered parachute of the present invention.

As indicated in FIG. 1, the powered parachute according to the present invention is indicated in general by reference numeral 10. Powered parachute 10 generally includes a power and control unit 12, a wing mechanism 14, and a support line 16 between the power and control unit 12 and wing mechanism 14.

Figure 2:
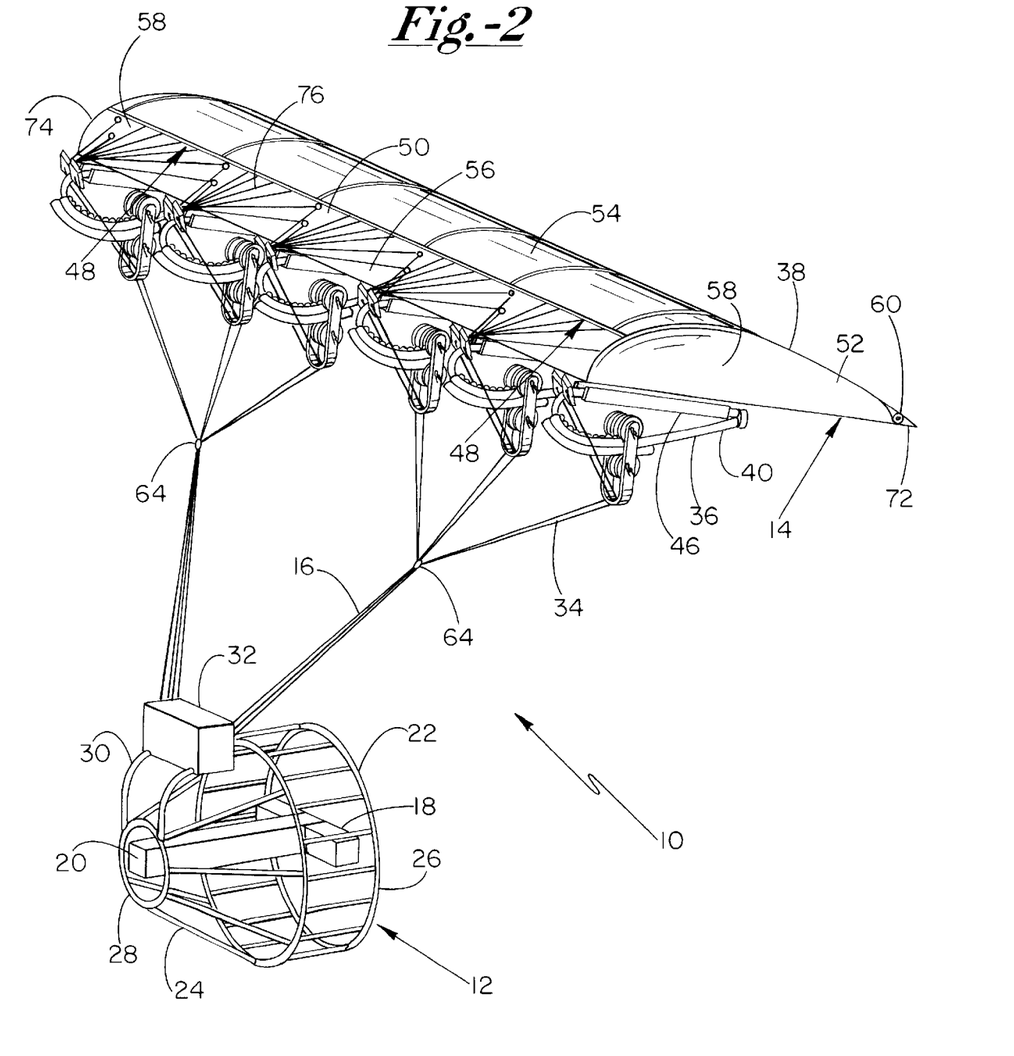
FIG. 2 is a perspective view of the powered parachute of FIG. 1 with the wing of the craft being in an orientation for a relatively slow speed such as take offs and landings and with the module of the craft being in a position relative to the wing for a relatively slow speed such as take offs and landings.

The power and control unit 12 includes a propeller 18 (schematically shown) driven by a power mechanism 20 (schematically shown). Power mechanism 20 is preferably an internal combustion engine or man powered mechanism similar to a bicycle gear mechanism. Propeller 18 and power mechanism 20 are housed in a cage 22. Cage 22 includes a frustoconical cage portion 24 for spacing the propeller 18 from a pilot and a cylindrical cage portion 26 for the propeller 18, as indicated in FIG. 2. The pilot is strapped to a front cage portion 28 of the frustoconical cage portion 24. Cable support cage portion 30 having two rearwardly extending tubes extends from the frustoconical portion 24 to the cylindrical cage portion 26. Cage 22 preferably is formed of lightweight tubes, more preferably lightweight aluminum tubes. Propeller 18 is a pusher propeller. Frustoconical cage portion 24 is preferably elongate to maximize and smooth the air flow to the propeller and to minimize the turbulence otherwise created as air is pulled into the propeller 18. Such turbulence is caused by the pilot and spacing the pilot as far from the propeller 18 as practically possible minimizes turbulence which increases overall efficiency, power and speed.

A winch 32 (schematically shown) is engaged to the cable support cage portion 30. The winch 32 is a control unit through which the pilot controls the cable mechanism 16, thereby controlling the wing mechanism 14. For example, a lever or cord or ratchet or similar mechanism extending from the winch 32 may be translated or amplified by the winch 32 so as to pull or permit the extension of one or more cables 34 of the cable mechanism 16. Such lever or cord or ratchet is operated by the pilot. It should be noted that winch 32 is movable or slideable along the tubes of cable support cage portion 30 to, for example, find a proper balance for the module 12 which may depend upon the weights of the pilot, the engine 20, the propeller 18, among other factors.

Figure 3:
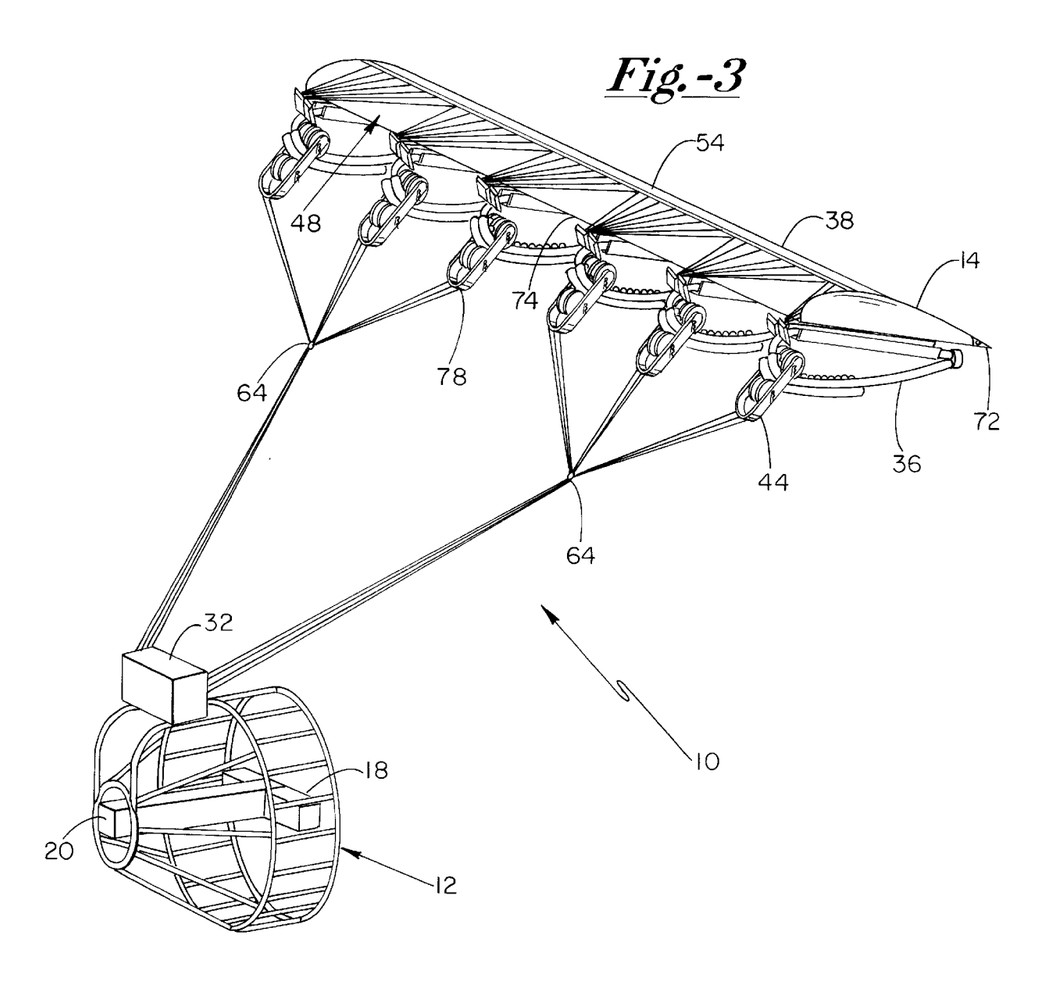
FIG. 3 is a perspective view of the powered parachute of FIG. 1 with the wing of the craft being in an orientation for a relatively fast speed and with the module of the craft being in a position relative to the wing for a relatively fast speed.

The wing mechanism 14 is shown in FIGS. 2 and 3. Wing mechanism 14 includes a plurality of longitudinally extending individual frame tubular portions 36. Frame portions 36 are laterally engaged only through a flexible fabric wing 38. Frame portion 26 is formed in generally in the shape of an ear or half pear and includes a lower wheel engaging tubular section 40 and a sling engaging tubular section 42. The wheel engaging tubular section 40 engages a center of gravity adjuster mechanism 44. The sling engaging tubular section 42 engages a sling 46 formed integrally with or as one piece with (i.e. sewn onto) the wing 38. Center of gravity adjuster mechanisms 44 is one of the elements controlled by cables 34.

Wing 38 includes a set of air cells 48 formed by a set of internal airfoil shaped air cell fabric walls 50 and two outer or end airfoil shaped air cell fabric walls 52. Wing 38 further includes an fabric airfoil or upper fabric panel or surface 54. Wing 38 further includes a lower wing surface or lower fabric panel 56. Air cell walls 50, 52, airfoil 54 and lower wing surface 56 are stitched to each other. Sling 46 is stitched both to the lower wing surface 56 and to the lower edge portion of each of the air cell walls 50, 52. Air cells 48 fill with air at takeoff.

Outer air cell walls 52 themselves fill with air. Each of the outer air cell walls 52 actually includes a pair of walls 58. The outer wall of such pair of walls 58 covers cables 34 so as to reduce turbulence and the resulting drag which otherwise may be caused by the cables 34. In addition, the outer wall of such pair 58 helps to seal (from air leaks) the overall wing 38. Too many leaks allow the wing to lose its shape and thereby produce inefficiency and possibly even collapse.

It should be noted that wing 38 is flexible. The fabric of wing 38 is flexible and is preferably nylon, and is more preferably a nylon parachute material.

Wing mechanism 14 includes a chord adjusting mechanism 60. A chord is by definition a straight line connecting the leading and trailing edges of an airfoil. An airfoil is an aircraft part or surface, such as a wing, propeller blade, or rudder, the shape of which controls stability, direction, lift, thrust, or propulsion. Chord adjusting mechanism 60 includes a set of lines 62 running from winch 32 to and through coordinating ring 64, to and through an aperture 66 in the center of gravity adjustment mechanism 44, to and through a hoop 68 fixed to the half pear frame portion 36, into one air cell 48, and through such air cell 48 to be fixed to a trailing edge tube 70. Tube 70, preferably of aluminum, runs along the trailing edge 72 of wing 38. Tube 70 may be formed by tube sections which snap or otherwise fit together or telescope. Tube 70 is in an elongate sock that effectively forms the trailing edge 72 of wing 38. Upper surface 54, lower surface 56, and such tube containing sock are sewn together in such a way so as to form a smooth trailing edge. Preferably wing mechanism 14 includes one chord adjusting line 62 for each inner air cell wall 50 and one line 62 for each outer wall 52. It should be noted that when filled with air, air cell 48 is rather defined, i.e. formed or relatively rigid, such that it maintains its shape. When chord adjusting line 62 is drawn in by the pilot and winch 32, it draws tube 70 so as to draw the trailing edge 72 towards the leading edge 74 thereby shortening the chord. FIG. 2 shows a relatively long chord length for low speed operation and FIG. 3 shows a relatively short chord length for high speed operation. As tube 70 is drawn in, tube 70 draws in a rear portion of airfoil upper surface 54 as well as a rear portion of lower surface 56. It should be noted that air cells 48, when filled with air, are relatively stiff and provide support for lines 62 which run rearwardly to tube 70. Line 62 may require a guide to prevent wearing out lower airfoil surface 56. Other portions of airfoil upper surface 54, such as general medial portions, are drawn in by a set of other lines 76. Each air cell 48 may have one set of lines 76. Each set of lines 76 may include about eight individual lines, the terminating ends of which are fixed to and control different areas of the airfoil upper surface 54 due to being connected to the upper portion of the air cell wall 50 or 52. The terminated ends of the lines 76 are fixed to air cell walls 50, 52 through grommetted holes to control the airfoil upper surface 54. When the air cell walls 50, 52 are drawn in to at least partially collapse, the air cell walls 50, 52 draw the upper and lower airfoil surfaces 54 and 56 together. Of the individual lines 76, one is drawn in a greater distance than the others so that only one fold is formed by the airfoil upper surface 54 (when the chord is shortened) so as to in turn minimize turbulence and the resultant drag. From their terminating ends to where they are affixed to air cell walls 50, 52, lines 76 run to one respective hoop 68, then to and one aperture 66 in center of gravity adjustment mechanism 44, then to and through coordinating ring 64, then to winch 32 where such lines are controlled by the pilot. To lengthen the chord of powered parachute 10, lines 62 and lines 76 are let out by the pilot and winch 32 in a controlled fashion and the air cells 48 are naturally expanded by air pressure. It should be noted that wing 38, as well as being shortened by lines 62 and 76, is also being "thinned." In other words, wing 38 includes a height or vertical distance defined as the height between the upper surface 54 and the lower surface 56, and that such a height is decreased as lines 76 are drawn in. It should be further noted that adjusting the height of wing 38 (by lines 76) is controllable independently of adjusting the length of wing 38 (by lines 62) due to the design of the winch 32.

Coordinating rings 64 consolidate the various control and support lines into two areas of drag. This reduces the overall drag and enables a flexible aerodynamic shaped covering to be added between winch 32 and the rings 64 to still further reduce drag. Additionally, the coordinating rings 64 enhance wing structural stability by providing a left side and a right side to an upper portion of the flying pendulum machine 10. This is similar to standing on two feet instead of one foot; greater flight stability is provided with a right side ring 64 and a left side ring 64.

It should be noted that the lines 76 of one set for one air cell 48 draw in different portions of the airfoil upper surface 54. These different portions are located at different distances from leading edge 74. One set of these lines 76 may be disposed in open ended tube having holes at different axial lengths corresponding to such different distances from leading edge 74 such that one line for one portion of the airfoil upper surface 54 exits one hole in the tube near such portion of the airfoil upper surface 54. Other lines exit other respective holes in the tube which are adjacent to the portions of the airfoil upper surface 54 to which they are connected. The lines 76 run from the grommets on cell walls 50, 52, through the holes in the tube, through the guides wider the tube to permit visual inspection of the length of all lines during preflight and post flight inspections, through hoop 68, through one aperture 66, through coordinating ring 64 and to winch 32. The tube is disposed in air cell 48 near one of the walls 50 or 52 or near the airfoil lower surface 56 and secured to framework or frame section 42 such as adjacent both ends of sling 46.

Figure 4:
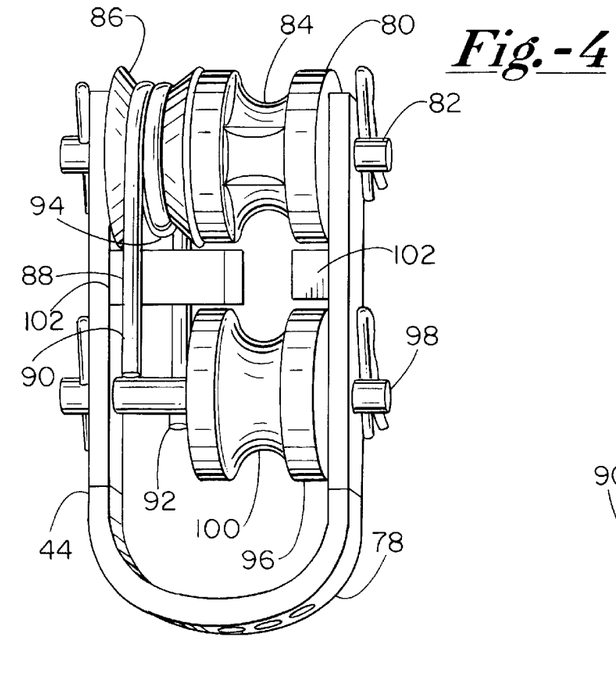
FIG. 4 is a front left side perspective view of a portion of the center of gravity adjusting mechanism for the powered parachute of FIG. 1.
Figure 5:
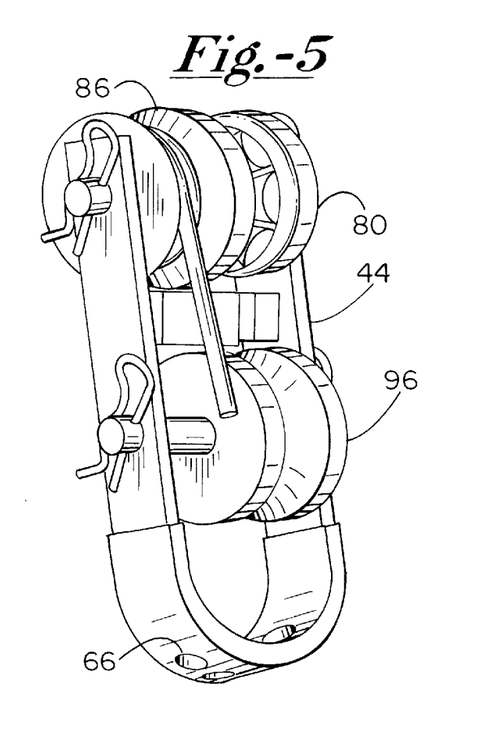
FIG. 5 is a front right side perspective view of the portion of the center of gravity adjusting mechanism of FIG. 4.
Figure 6:
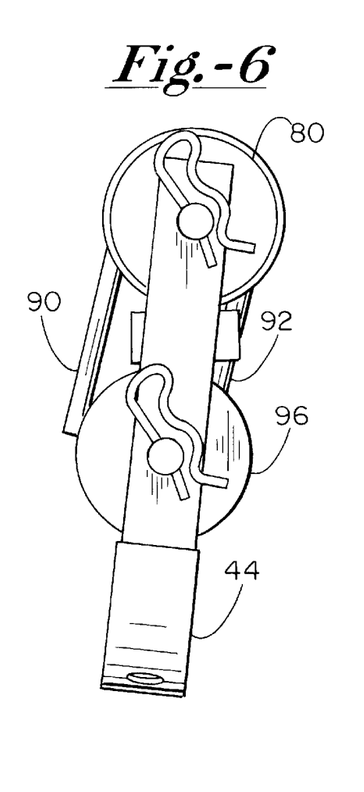
FIG. 6 is a side view of the portion of the center of gravity adjusting mechanism of FIG. 4.

As shown FIGS. 4, 5 and 6, center of gravity adjusting mechanism 44 includes a U-shaped frame 78 which mounts a cogged drive wheel 80 via an axle 82. Drive wheel 80 includes cogs or teeth 84 and further includes a power input or drive pulley 86 rigidly fixed to the wheel 80. Drive pulley 86 includes a bight for engaging a drive line 88. Drive line 88 includes two line portions 90 and 92. Pulling on one of the line portions 90, 92 drives the cogged wheel 80 in one direction and pulling on the other of the line portions 90, 92 drives the cogged wheel 80 in the other direction. Drive line 88 may be further engaged to drive pulley 86 by being tied or otherwise rigidly fixed to the drive pulley 86 via a clamp 94 so as to minimize the chance of slippage of line 88 relative to the bight of the pulley 86. Center of gravity adjusting mechanism 44 further includes a passive wheel 96 mounted to the U-shaped frame 78 via an axle 98. Passive wheel 96 includes a circumferential groove 100. Center of gravity adjuster 44 further includes alignment bars or spacers 102 running inwardly towards one another from opposite portions of the U-shaped frame 78.

Center of gravity adjusting mechanism 44 further includes tube section 40 and further includes teeth 104 on tube section 40 for meshing with teeth 84 on drive wheel 80. Teeth 104 run generally from a middle portion of tube section 40 to a front or leading edge portion of tube section 40. Center of gravity adjusting mechanism further includes a stabilizing tube section 106 rigidly fixed to a portion of the underside of tube section 40 to effectively add height to tube section 40. Stabilizing tube section 106 is received by groove 100 of passive wheel 96. Stabilizing tube section 106 runs generally the length of teeth 104.

Figure 7:
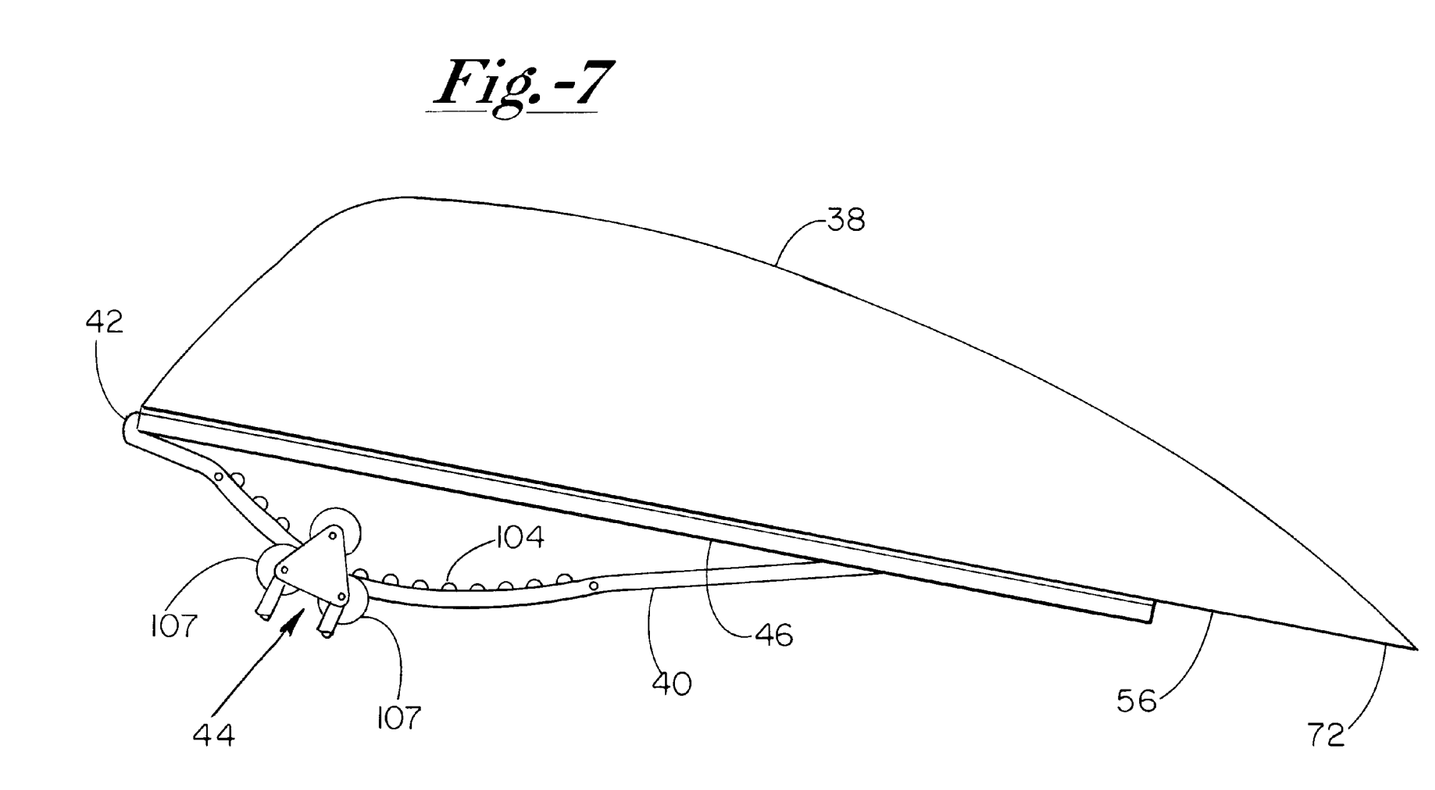
FIG. 7 is a side view of an alternate embodiment of the center of gravity adjusting mechanism.

It should be noted that, if desired, as shown in FIG. 7, two passive wheels may be included in the design, with the passive wheels 107 running forwardly and rearwardly of each other to minimize crushing of tube section due to the various forces of flight. Another means to reduce crushing of tube 106 would be to replace the lower passive wheels 107 of mechanism 44 with a U-shaped skid.

Center of gravity adjuster mechanism 44 further includes a rear stop or tab 108 extending from tube section 40 near a rear portion of teeth 104 and a front stop or tab 110 extending tube section 40 near a front portion of teeth 104. The drive wheel 80 abuts stops 108, 110 to stop the travel of wheel 80.

Lines 90, 92 run from pulley 86 to and through one or more apertures 66 formed in U-shaped frame 78, to and through coordinating ring 64, and to the winch 32, where such lines 90, 92 are controlled by the pilot.

Spacers 102 abut side portions of tube sections 40 and 106 to prevent wobbling of center of gravity mechanism 44 relative tube sections 40 and 106.

It should be noted that powered parachute 10 includes preferably about six center of gravity adjuster mechanisms 44. Mechanisms 44 may work in unison or independently of the others. Mechanisms 44 are preferably operated in unison.

In operation, at takeoff, the center of gravity mechanisms 44 are preferably generally at the location shown in FIG. 1, with drive wheel 80 at or near rear stop 108. Further at takeoff, the chord of wing 38 is preferably as long as possible. The height of the wing 38 is preferably as great as possible. Such an orientation or structure provides greater lift at low speed and also provides a greater rate of climb. A greater rate of climb provides an increased measure of safety for flight; in the event of a malfunction or other hazard, a greater response time is provided of course at higher altitudes. In relatively high winds, the chord may be shortened and the height of the wing 38 may be reduced, enabling take offs and landings at low ground speeds.

Once safely airborne and at the desired altitude, ore of the lines 90, 92 may be pulled to drive the drive pulley 86 to drive the drive wheel 80 to draw the center of gravity mechanism 44 forwardly along teeth 104 and tube section 40 to change the center of gravity of powered parachute 10. This permits greater speed which heretofore has not been possible with pendulum flying devices. Further, preferably at the same time that center of gravity adjuster mechanism 44 is drawn forwardly to change the center of gravity of the pendulum flying machine 10, one or both of the sets of lines 62 and 76 are pulled to shorten the chord of wing 38 and to reduce the height of wing 38. This provides less drag and permits higher speed. This may provide less lift at a given speed, yet the attendant higher velocity permits one to maintain altitude.

The pilot turns the powered parachute 10 in the standard way that powered parachute, i.e. such as flaps or aileron somewhere on the wing 38. Lines may run from such aileron to and through hoops 68, to and through apertures 66, to and through coordinating ring 64 and to winch 32. Alternatively, changing the length of one set of lines 76 for one air cell 48 on one end of wing 38 changes airflow over such portion of wing 38 so as to change drag and lift over such a portion. Wing 38, and hence powered parachute 10, turns in the direction where such drag is increased due to varying forces at varying speeds, conflicting flight responses will determine the actual direction of travel.

The pilot increase and decreases altitude by adjusting the position of center of gravity adjuster mechanism 44 or by changing the chord length of wing 38 or by changing the height of wing 38 or by increasing or decreasing power to the propeller 18.

For landing the powered parachute 10, the pilot puts the powered parachute 10 in the take off mode, decreases power, and lands. It should be noted that when line 90 or 92 is pulled so as to draw the center of gravity adjuster 44 rearwardly, air pressure aids in the drawing of adjuster 44 rearwardly. It should further be noted that, if desired, only one line 90 or 92 may be included for drawing the mechanism 44 forwardly because tube section 40 is naturally at an incline when pendulum flying machine 10 is in flight and mechanism 44 naturally rolls rearwardly due to gravity.

For portability and storage of powered parachute 10, the rod 70 is telescoped or its sections are separated, which permits the half pear frame portions 36 to be drawn together in compact fashion. Additionally, winch 32 draws in the lines 62, 76, 90 and 92 and any other general line 16, such as that used for any aileron.

It should be noted that the module 12 may include a seat for the pilot and wheels for landing and takeoff. The module 12 may further include ailerons and a rudder located rearwardly of the propeller and used to augment turning and attitude control.

It should further be noted that support lines or cables 16 are of relatively high strength. Powered parachute 10 may include about six support cables 16 which run from winch 32 or frame 22 of module 12, to and through coordinating ring 64 and to one aperture of one respective U-shaped frame 78 where the terminating end of such cable 16 is fixed.

FIG. 7 shows a view taken closer to the powered parachute 10 and intends to show that the center of gravity adjusting mechanism 44 (having the two passive wheels 107) including the teeth 104 may be closer to the airfoil lower surface or sheet 56. Further, FIG. 7 shows that the teeth 104 have been shifted rearwardly. The closer the center of lift of the wing 38 is to the center of gravity of the powered parachute 10 as a whole, the less drag that is provided; a higher speed is therefore possible.

It is preferable to place the center of gravity adjusting mechanism 44 as close to the lower surface 56 of the airfoil as possible. If desired, tube section 42 may be placed on the air cell wall 50 or 52 instead of hanging in sling 46 from lower surface or sheeting 56. Such may enable the center of gravity adjusting mechanism to ride even higher and thus be disposed closer to the chord line. The closer the line of thrust of the propeller 18 is to the chord line of the airfoil, the greater is the efficiency of the powered parachute 10. Accordingly, as well as moving the teeth 104 closer to the lower surface 56, the support cables 16 may be shortened. However, it may be difficult to shorten the length of the support cables 16 considerably, as such may be dependent upon the width of the wing 38. Coordinating rings 64 are tied to the winch 32 to keep the rings 64 stationary to provide more stability throughout the craft 10.

It should be noted that wing 38 includes a set on leading edges 74. One leading edge is a front edge portion of airfoil upper sheet or surface 54. Other leading edges are found on the front edge portions of walls 50, 52. Another leading edge is a front edge portion of the airfoil lower sheet or surface 56.

The first objective of the powered parachute 10 is speed enhancing. The second objective is to enable shorter short field take-offs and landings for airplanes.

The present powered parachute 10 may take various shapes and sizes with different configurations for harnessing the pilot to the parachute such as seats and tricycle landing gear with various leading and trailing edges of the parafoil 38 and various control mechanisms. For example, instead of lines 62, 76, 90, and 92, infrared or radio control mechanisms may be used. These infrared mechanisms may include a control on the module 12, with infrared signals being sent to a main winch on the wing 38 or to one or more of a plurality of individual winches on the wing 38 for each of the lines 62, for each of the lines 76, for each of the lines 90, and for each of the lines 92.

The concepts of the present powered parachute 10 may be used to prevent catastrophic damage to airplanes in the event of mechanical failure to enable some control during descent to the ground. The powered parachute 10 may enable the aerial dropping of space capsules. The powered parachute 10 may be a radio controlled wing parachute enabling greater distance aerial supply dropping. The powered parachute 10 may be completely retracted into the fuselage of an aircraft, enabling regular flight by the aircraft or into a pod external to the aircraft. The powered parachute 10 may be used by a conventional airplane during takeoff and released after take off such as when the desired altitude is reached. A second powered parachute may be on such an airplane, and carried on such an airplane in retracted form until deployed for landing.

The primary means of enhancing speed in flight is accomplished by the shortening the chord of the wing and decreasing wing height. Increased power has a greater effect on attitude adjustment when the center of gravity adjuster mechanism 44 is on a rearward portion of teeth 104. In other words, the amount of power required to increase the rate of climb becomes less as the center of gravity adjuster mechanism 44 moves closer to the rear stop 108. More importantly, moving the center of gravity forward in pendulum flying requires greater air speed to generate sufficient lift to maintain flight. Alternatively, decreasing power with the center of gravity adjusting mechanism 44 at a forward portion of the teeth 104 increases the rate of descent or reduces the glide ratio in pendulum flying. As the center of gravity adjuster mechanism 44 moves rearwardly, a slower velocity can be achieved. In some instances this may also be desired, such as when landing the device 10.

The present wing 38 may be used as an accessory wing on an airplane. It is possible to eject the parachute wing 38 after the airplane reaches a desired altitude, with the parachute wing 38 being retrieved later by a ground crew. Such an accessory wing 38 may save weight of and reduce complexity in the airplane. A second parafoil or parachute wing 38 may also be used for landing (stored inside the airplane or in a pod outside). This may also enable the aircraft to be modified only relatively slightly compared to tilt wing designs to enhance its short field capabilities. Advantageously, the benefits of such an accessory wing 38 outweighs its cost, which is minimal. Also, the add on wing 38 may enable more planes to land on and take off from ships. The airplane noted above may be a relatively lightweight small airplane such as a Cessna 152 or a relatively large airplane or heavy duty military aircraft such as a Hercules C-130.

In order to stabilize the parafoil or wing 38 for adverse weather take-offs and landings, a few more lines extending to the wing spar of a standard airplane (presumably to the midpoint of the wing spar) and along the fuselage may improve crosswind take-off and landing ability for airplanes with the parachute attachment. Additionally, the far shorter lines with the present parachute 10 (than is commonly found with traditional powered parachutes flying) improves adverse weather take-offs and landings, as well as performance in flight.

The purpose of the invention is to enable a higher velocity of a powered parachute, thereby increasing the versatility of the sport device. This is accomplished in part by the chord adjustment mechanism 60 for shortening the chord of the parachute wing 38 and by providing a leading edge that is flexible for storage or portability and stiffened by inflating the bladders or air cells. A stiffened leading edge provides smoother air flow over the wing thus reducing drag and consequentially increasing speed.

Prior art parachutes have slots in the parachute to enable turning.

The airfoil shape may also be segmented in order to allow compact storage. These segments could simply be cuts or they could be cuts with reconnecting and aligning re-connectors such as Velcro tapes snaps lacing.

Additionally, there may be interlocking ends of the bladders or air cells 48. Such a structure may further strengthen the wing 38, thereby providing greater maneuverability to the powered parachute 10.

There may also be a locking mechanism for the chord shortening device so as to prevent the chord from lengthening during high speed flight and possibly shredding the lines, due to the sudden increase in load factors of increased drag.

Due to the fact that air pressure from forward motion of the airfoil 38 ensures a smooth and efficient lifting upper surface 54, it may be desirable to keep the upper and lower leading edges separate in order to allow air in. Lower airfoil surface sheet or surface 56 may have an airfoil shape maintained by air pressure.

The trailing edge 72 of wing 38 is formed by the intersection of the upper and lower surfaces or sheets 54 and 56, and such an intersection may be partially opened, as it may be desirable to let an extremely small amount of air pass through the parachute wing 38 to reduce turbulence and drag on the wing 38 as a whole.

It may also be desirable to make air flow variable through the trailing edge 72 for other reasons such as increased turning rates which may make a vertical or substantially vertical descent possible.

Shortening of the chord may also be accomplished by a spring loaded device for a once per flight actuation. The springs may shorten the chord a predetermined amount with a releasing mechanism to enable the chord to be extended to allow a normal slow landing.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

I claim:

1. A powered parachute comprising, in combination:
    a) a pilot module comprising a frame, a power mechanism, and propeller, with the power mechanism and propeller being mounted on the frame and with the power mechanism driving the propeller;
    b) a wing comprising air cells fillable by air when the powered parachute is in flight, a leading edge and a trailing edge, with the wing further comprising a frame portion running generally in a direction between the leading and trailing edges of the wing; and
    c) a movable mechanism engaged on the frame portion of the wing and comprising a support line depending therefrom to the pilot module to connect the pilot module to the wing such that the pilot module and wing are connected to each other pendulum style, with the movable mechanism being movable on the frame portion in said direction between the leading and trailing edges, with moving of the mechanism in said direction being controllable by a pilot so as to change a position of the pilot module relative to the wing and thereby change the center of gravity of the powered parachute.

2. The powered parachute of claim 1 wherein the movable mechanism comprises a drive wheel engaging the frame portion and being manually driven in said direction by the pilot.

3. The powered parachute of claim 1 wherein the movable mechanism comprises a drive wheel engaging the frame portion and a passive wheel further engaging the frame portion, with the drive and passive wheels generally opposing each other and with the frame portion being between the drive and passive wheels.

4. The powered parachute of claim 1 wherein the movable mechanism comprises a toothed wheel having a pulley mechanism and wherein the frame portion is toothed, with the pulley mechanism comprising a line such that when the line is pulled the toothed wheel rotates, with the rotation of the toothed wheel drawing the movable mechanism in said direction to change the center of gravity of the powered parachute.

5. The powered parachute of claim 1 and further comprising another movable mechanism and another frame portion, with the movable mechanisms being controllable independently of the other.

6. The powered parachute of claim 1 and further comprising another movable mechanism and another frame portion, with the movable mechanisms being controllable in unison.

7. A powered parachute comprising, in combination:
    a) a pilot module comprising a frame, a power mechanism, and propeller, with the power mechanism and propeller being mounted on the frame and with the power mechanism driving the propeller;
    b) a wing comprising air cells fillable by air when the powered parachute is in flight, a leading edge and a trailing edge;
    c) at least one support line between the pilot module and the wing to connect the pilot module to the wing in a pendulum style manner; and
    d) a drawable mechanism engaged to at least portions of the trailing edge of the wing and drawable forwardly in said direction towards the leading edge to draw the trailing edge towards the leading edge and shorten chord length of the wing whereby lift is reduced and speed of the powered parachute is increased.

8. The powered parachute of claim 7 wherein the drawable mechanism comprises an elongate support running along the trailing edge of the wing to draw the trailing edge uniformly towards the leading edge.

9. The powered parachute of claim 7 and further comprising a line running from the drawable mechanism to the pilot module whereby the drawable mechanism is drawable manually towards the leading edge of the wing.

10. The powered parachute of claim 7 wherein the drawable mechanism is driveable rearwardly when air pressure in the air cells increases.

11. A powered parachute comprising, in combination:
    a) a pilot module comprising a frame, a power mechanism, and propeller, with the power mechanism and propeller being mounted on the frame and with the power mechanism driving the propeller;

b) a wing comprising air cells fillable by air when the powered parachute is in flight, an airfoil upper surface, and an airfoil lower surface;

c) at least one support line between the pilot module and the wing to connect the pilot module to the wing in a pendulum style manner; and d) a drawing mechanism engaged to at least portions of one of the airfoil upper surface and airfoil lower surface, with the drawing mechanism drawing at least one of the airfoil upper surface and airfoil lower surface towards the other surface whereby wing height is reduced to thereby reduce drag and allow for an increase in speed of the powered parachute.

12. The powered parachute of claim 11 wherein the drawing mechanism comprises at least one line running from a wall between the airfoil surfaces to the pilot module.

13. The powered parachute of claim 11 wherein the drawing mechanism comprises a wall which is collapsible between the airfoil surfaces, with the airfoil surfaces being drawn together when the wall is at least partially collapsed.

14. A powered parachute comprising, in combination:

a) a pilot module comprising a frame, a power mechanism, and propeller, with the power mechanism and propeller being mounted on the frame and with the power mechanism driving the propeller;

b) a wing comprising air cells fillable by air when the powered parachute is in flight, a leading edge, a trailing edge, an airfoil upper surface, and an airfoil lower surface, with the wing further comprising a frame portion running generally in a direction between the leading and trailing edges of the wing;

c) a movable mechanism engaged on the frame portion of the wing and comprising a support line depending therefrom to the pilot module to connect the pilot module to the wing such that the pilot module and wing are connected to each other pendulum style, with the movable mechanism being movable on the frame portion in said direction between the leading and trailing edges, with moving of the mechanism in said direction being controllable by a pilot so as to change a position of the pilot module relative to the wing and thereby change the center of gravity of the powered parachute in flight and on the ground;

d) a drawable mechanism engaged to at least portions of the trailing edge of the wing and drawable forwardly in said direction towards the leading edge to draw the trailing edge towards the leading edge and shorten chord length of the wing whereby lift and drag are reduced and potential speed of the powered parachute is increased for a given amount of power; and e) a drawing mechanism engaged to at least portions of one of the airfoil upper surface and airfoil lower surface, with the drawing mechanism drawing at least one of the airfoil upper surface and airfoil lower surface towards the other surface whereby wing height is reduced to thereby further reduce lift and drag and further increase potential speed of the powered parachute for a given amount of power.

* * * * *